United States Patent [19]
Kim

[11] Patent Number: 5,951,436
[45] Date of Patent: Sep. 14, 1999

[54] TRANSMISSION CONTROL SYSTEM FOR AN ELECTRIC VEHICLE

[75] Inventor: Chun-ho Kim, Kwangmyung, Rep. of Korea

[73] Assignee: KIA Motors Corporation, Seoul, Rep. of Korea

[21] Appl. No.: 08/777,948

[22] Filed: Dec. 23, 1996

[30] Foreign Application Priority Data

Sep. 17, 1996 [KR] Rep. of Korea .................... 96-40373

[51] Int. Cl.⁶ .................................................. B60K 41/08
[52] U.S. Cl. ............................................................ 477/20
[58] Field of Search ................................ 477/15, 20

[56] References Cited

U.S. PATENT DOCUMENTS

| | | | |
|---|---|---|---|
| 3,896,914 | 7/1975 | Konsbruck et al. | 477/15 |
| 3,984,742 | 10/1976 | Bader | 477/15 |
| 5,287,772 | 2/1994 | Aoki et al. | 477/20 |
| 5,395,293 | 3/1995 | Matsumra et al. | 477/20 |
| 5,403,244 | 4/1995 | Tankersley et al. | 477/20 |
| 5,498,216 | 3/1996 | Bitshce et al. | 477/20 |
| 5,720,690 | 2/1998 | Hara et al. | 477/20 |

*Primary Examiner*—Dirk Wright

[57] ABSTRACT

A transmission control system for an electric vehicle, includes a motor for directly converting electric energy to usable mechanical energy and a transmission connected to the motor without clutch. A motor speed sensor detects motor speed and a wheel speed sensor detects wheel speed. A shift fork sensor detects shift fork movement. An inverter controls the motor and a control unit controls the inverter in accordance with the motor speed sensor signal and the wheel speed sensor signal.

5 Claims, 2 Drawing Sheets

TRANSMISSION CONTROL SYSTEM FOR AN ELECTRIC VEHICLE

FIELD OF THE INVENTION

The present invention relates to a transmission control system for an electric vehicle and more particularly to a transmission control system for an electric vehicle which does not have any clutch.

DESCRIPTION OF RELATED ART

Electric vehicles were in practical use even before gasoline vehicles were invented. However, as the gasoline vehicle was developed due to its accelerating ability, mounting ability, driving ability and high speed, electric vehicles gradually disappeared.

However, in recent years, interest in electric vehicles has increased for environmental reasons. Therefore, many parts of the electric vehicle, for example, the electric motor, controller, and drive system, have been examined and are developed.

The electric vehicle must be designed differently from the internal combustion engine vehicle, because the characteristics of the motor are different. Specially, the power train including transmission must be designed differently because the torque characteristic of the electric motor is different from that of the internal combustion engine. However, the conventional electric vehicle usually adopts the transmission used in the internal combustion engine vehicle.

The conventional powertrain for an electric vehicle includes a motor, a flywheel and a clutch connected to the motor, a transmission, a final reduction gear, and a differential gear. Generally, the synchromesh type transmission is used in a conventional electric vehicle.

That is, the transmission has an input shaft or clutch shaft having integral main drive gears and rotating with a clutch-driven plate (disc) and an output shaft having countergears and a synchronizer assembly.

The synchronizer assembly consists of a hub, a sleeve and so forth. A shift fork is positioned in grooves in synchronizer sleeves and controls sleeve position. Shifting is accomplished while the clutch is being disengaged.

Therefore, this type of transmission needs a clutch, which causes a complex structure and high cost to manufacture.

SUMMARY OF THE INVENTION

The present invention has been made in an effort to solve the above described problems of the conventional transmission system for an electric vehicle.

It is an object of the present invention to provide a transmission control system for an electric vehicle which does not have a clutch.

It is another object of the present invention to provide a transmission control system which is simple and inexpensive to manufacture.

The present invention focuses on the characteristic of the motor for an electric vehicle in comparison with the gasoline engine. That is, in an electric vehicle it is easy to control motor speed or motor torque, thus structure of the transmission can be simpler than that of the transmission used in internal combustion engine vehicle.

To achieve the above objects, the present invention provides a transmission control system for an electric vehicle, comprising: a motor for converting electric energy to usable mechanical energy directly; a transmission connected to the motor without clutch; a motor speed sensor for detecting motor speed; a wheel speed sensor for detecting wheel speed sensor; a shift fork sensor for detecting shift fork movement; an inverter for controlling the motor; and a control unit for controlling the inverter in accordance with the motor speed sensor signal and the wheel speed sensor signal.

BRIEF DESCRIPTION OF THE DRAWINGS

The foregoing and other objects of the present invention will become more apparent from the detailed description below when taken in conjunction with the following drawings in which.

DETAILED DESCRIPTION OF THE PREFERRED EMBODIMENT

Figure 1:
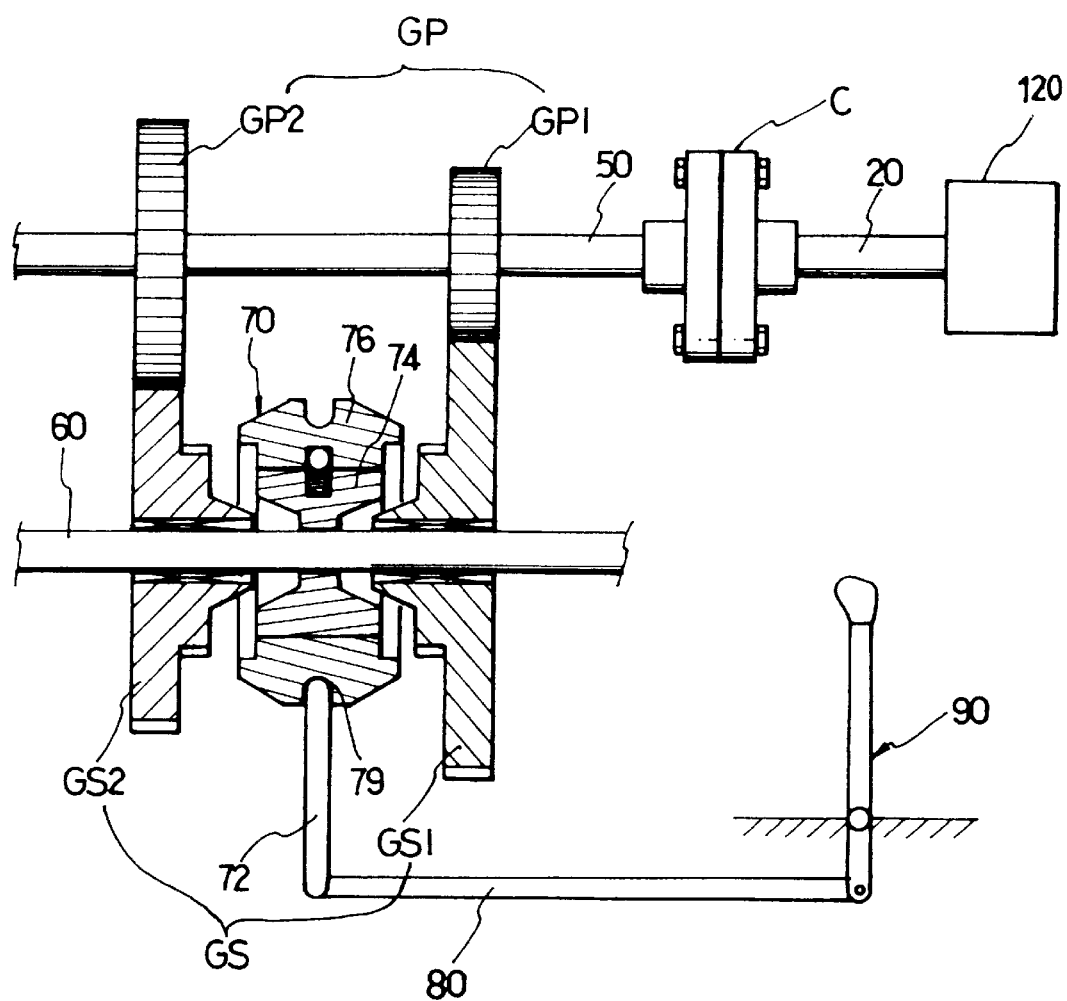
FIG. 1 is a schematic representation illustrating the powerline of transmission for an electric vehicle in accordance with a preferred embodiment of the present invention.

Referring to FIG. 1, in the powertrain for an electric vehicle, an input shaft 50 is directly connected to a motor shaft 20 through a coupling C without any flywheel or clutches. The input shaft 50 has main drive gears GP and the output shaft 60 has countergears GS and a synchronizer assembly 70. The main drive gears GP have a first speed gear GP1 and a second speed gear GP2. The countergears GS have a first speed countergear GS1 and a second speed countergear GS2.

The input shaft 50 rotates all the time when the motor 120 is rotating, and also the main drive gears GP1 and GP2 also rotate. In addition, since the countergears GS1 and GS2 are in constant mesh with the main drive gears GP1 and GP2, they also rotate when the motor 120 is rotating.

The countergears GS1 and GS2 rotate independent of the output shaft 60 and are in constant mesh with the main drive gears GP1 and GP2, respectively.

The synchronizer assembly 70 is connected to a shift lever 90 by a shift fork 72 and a shift rod 80. The synchronizer assembly 70 consists of a hub 74, a sleeve 76 and so forth. The synchronizer hub 74 is splined to the output shaft 60. The sleeve 76 is splined to the hub 74 but can slide fore and aft on the hub 74. The shift fork 72 is positioned in a groove 79 in the sleeve 76 and controls sleeve position. This assembly permits a smooth gear engagement without clashing by synchronizing the speeds of mating parts before they engage with each other.

Figure 2:
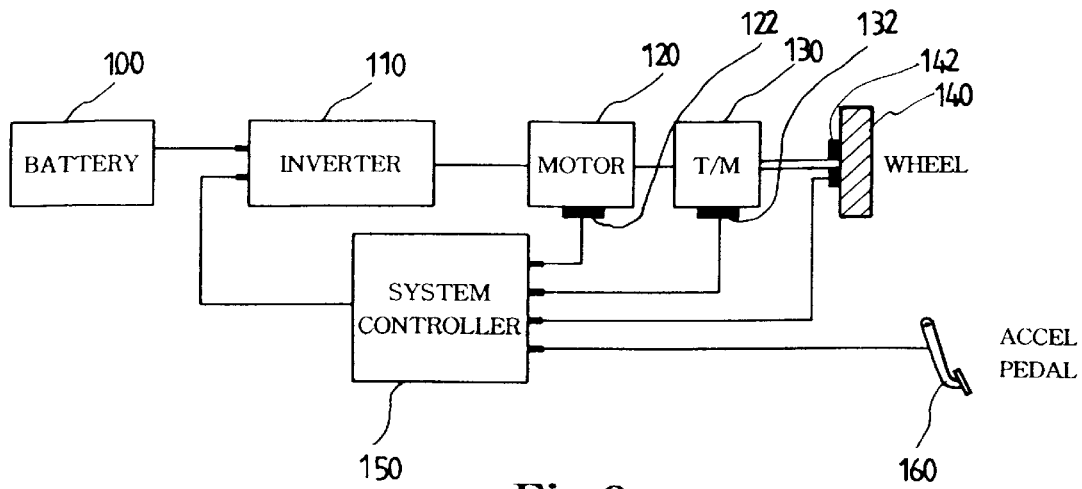
FIG. 2 is a schematic block diagram illustrating the transmission control system for an electric vehicle in accordance with the preferred embodiment of the present invention.

Now referring to FIG. 2, the inventive transmission control system for an electric vehicle includes the motor 120 for converting electric energy to usable mechanical energy directly; a transmission 130 connected to the motor 120 without clutch; a motor speed sensor 122 for detecting motor speed; a wheel speed sensor for detecting wheel speed sensor 142; a shift fork sensor 132 for detecting shift fork movement; an acceleration sensor for detecting accelerator displacement; an inverter 110 for controlling the motor 120; and a control unit 150 for controlling the inverter 110 in accordance with the motor speed sensor signal and the wheel speed sensor signal.

The control unit 150 also receives signals from an accelerator pedal sensor 160. Reference number 100 in FIG. 2 indicates a battery for electric vehicles.

When the shift lever 90 is moved, the movement is carried through the shift rod 80 and the shift fork 72 to the synchronizer assembly 70 and the shift fork movement is detected by the shift fork sensor 132.

At this point, the shift fork sensor signal is provided to the control unit 150. The control unit 150 determines the output shaft speed and the countergear speed in accordance with the wheel speed sensor signal and the motor speed sensor signal, and then the control unit 150 controls the inverter 110 such that the output shaft speed is the same as the countergear speed, and then the output shaft speed is the same as the countergear speed. At this time the sleeve 76 is able to move into full engagement with the synchronizer teeth 62 on the countergear GS1 and GS2. This prevents clashing of gears during gear shifting.

The amount of the motor torque for control is determined by the following equation.

Since $T1=J1*(dw/dt)$, $T1+T2=(J1+J2)*(dw/dt)$ then $T2=(J2/J1)*T1=(J2/J1)*F(X)$ where, J1=the moment of inertia of the input shaft 50, the input shaft gear and output shaft gear (countergear GS1 and GS2)

J2=the moment of inertia of the motor shaft 20 and the coupling 500

T1=friction torque

T2=motor torque for control

X=shift fork displacement.

Now, the method for determining direction of the motor torque for control will be explained.

If the speed of the output gears GS1 and GS2 which is same as that of the input shaft 50 is faster than the speed of output shaft 60, the direction of the motor torque is positive.

If the speed of the output gears GS1 and GS2 is less than the speed of output shaft 60, the direction of the motor torque is negative.

If the speed of the output gear GS1, GS2 is the same as the speed of output shaft 60, the direction of the motor torque is zero.

Figure 3:
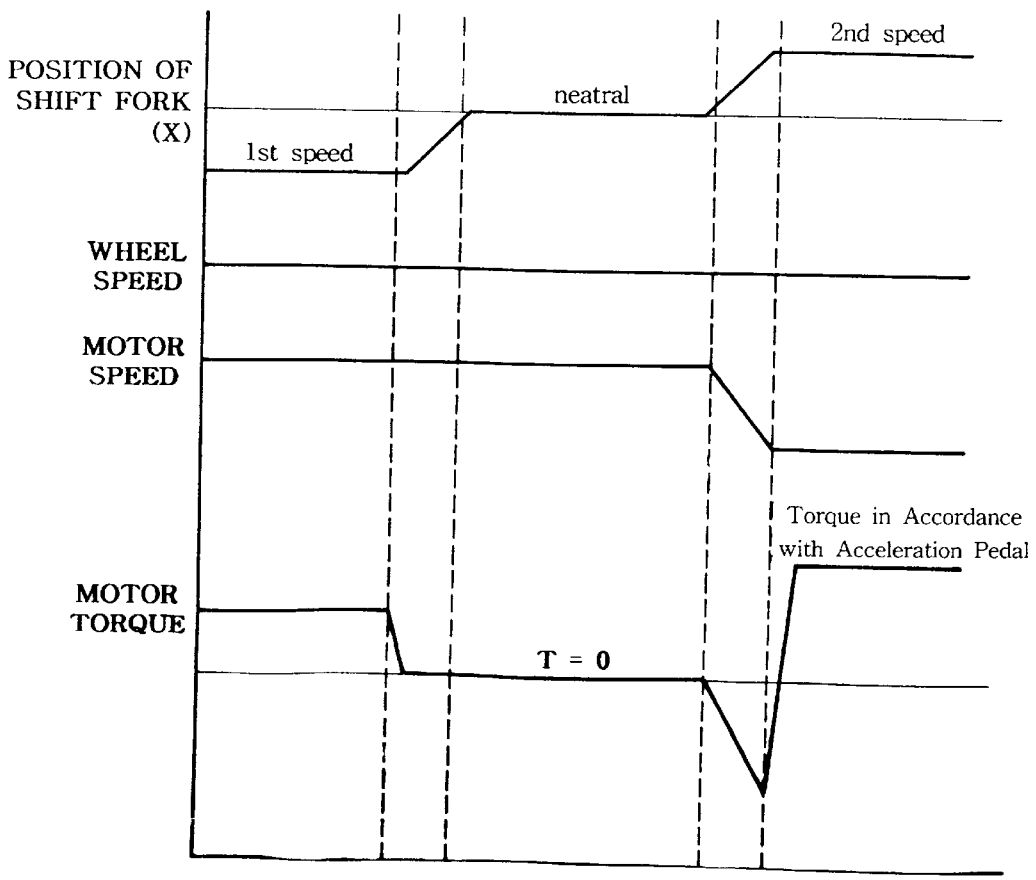
FIG. 3 is a graph showing the change in motor speed and motor torque when gear shifting.

FIG. 3 is a graph showing the change of motor speed and motor torque for control when gear shifting, which is explained above.

As described above, since the transmission control system according to the present invention can be shifted without a clutch, the gear shifting is simple and comfortable.

Also, the system is simple and inexpensive to manufacture.

Although preferred embodiments of the present invention have been described in detail hereinabove, it should be clearly understood that many variations and/or modifications of the basic inventive concepts herein taught which may appear to those skilled in the present art will fall within the spirit and scope the present invention, as defined in the appended claims.

What is claimed is:

1. A transmission control system for an electric vehicle, comprising:

a motor;

a manual transmission including a shift fork connected to said motor;

a motor speed sensor for detecting motor speed;

a wheel speed sensor for detecting wheel speed;

a shift fork sensor for detecting shift fork movement;

a manual shift lever connected to the shift fork to induce speed shifting;

a shift rod secured to said shift lever to operate said manual transmission;

an inverter for controlling said motor to determine the amount and direction of the motor torque; and a control unit for controlling said inverter in accordance with signals received from said motor speed sensor, said wheel speed sensor and said shift fork sensor.

2. A transmission control system for an electric vehicle according to claim 1, wherein said transmission has an input shaft connected to said motor, an output shaft including a synchronizing assembly having a sleeve, main gears mounted on the input shaft, counter gears mounted on the output shaft, said shift fork being positioned in the sleeve and connected to a shift lever.

3. A manual transmission control system for an electric vehicle, comprising:

a motor;

a manual transmission connected to said motor;

a motor speed sensor for detecting motor speed;

a wheel speed sensor for detecting wheel speed;

a shift fork sensor for detecting shift fork movement within said manual transmission;

an inverter for controlling said motor; and a control unit for controlling said inverter as a function of signals received from said motor speed sensor and said wheel speed sensor.

4. The transmission control system of claim 2, wherein gear shifting occurs without a clutch.

5. The transmission control system of claim 3, wherein gear shifting occurs without a clutch.

* * * * *